United States Patent Office 3,468,136
Patented Sept. 23, 1969

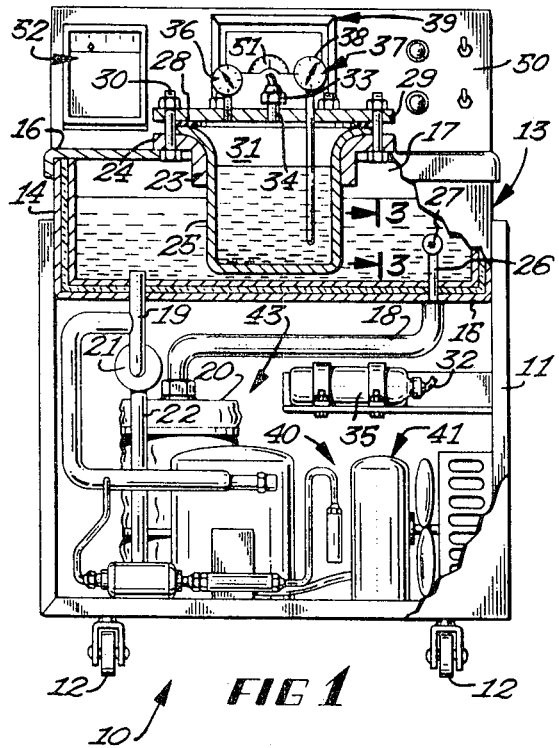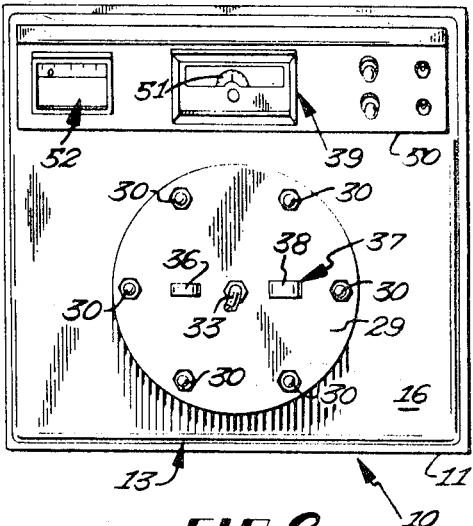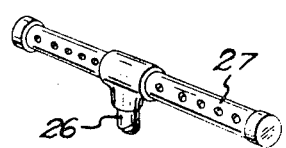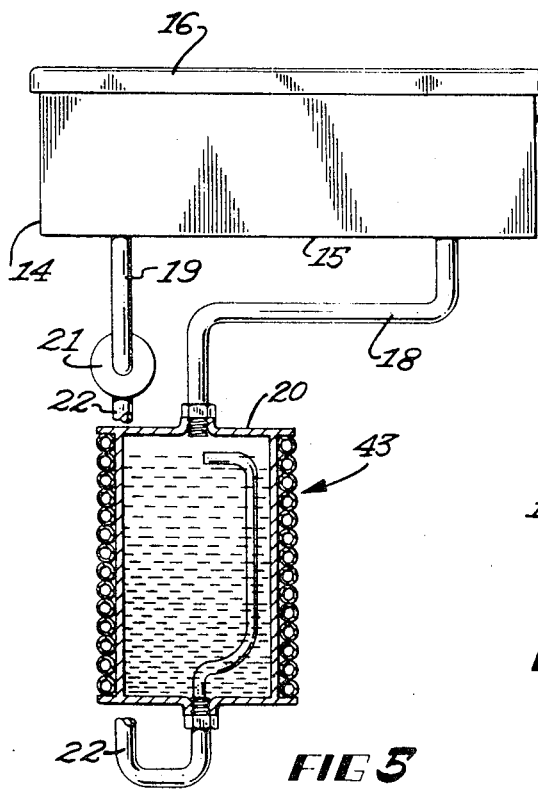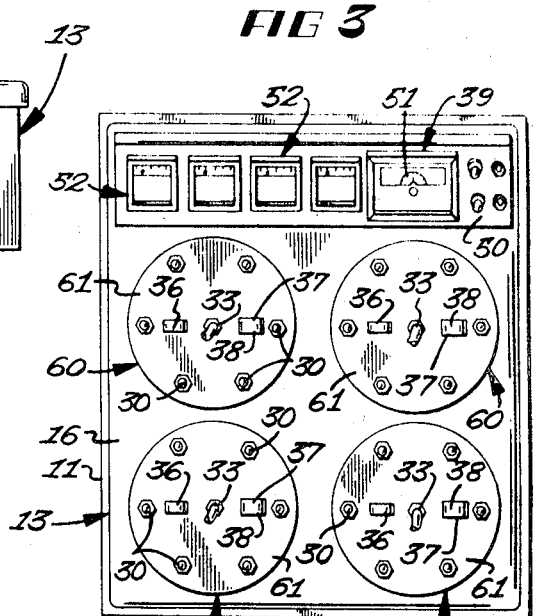

3,468,136
METHOD FOR MAINTAINING ORGANS IN A COMPLETELY VIABLE STATE
Emil S. Swenson, 247 106th Ave. NW., Coon Rapids, Minn. 55433, and William L. Koski, 3905 Halifax Ave. N., Minneapolis, Minn. 55422
Original application Aug. 25, 1964, Ser. No. 391,931, now Patent No. 3,406,531, dated Oct. 22, 1968. Divided and this application July 16, 1968, Ser. No. 753,025
Int. Cl. A61b *19/00;* F25d *17/02*
U.S. Cl. 62—64        3 Claims

ABSTRACT OF THE DISCLOSURE

The invention is concerned with providing a process for storing body organs in a viable state preparatory to transplanting and consists of a sealed pressure tight container in which preserving liquid and the organ are stored. The container is kept at an optimum temperature range of 0° C. to 4° C. by an indirect refrigeration system in which a holdover liquid such as alcohol solution transfers heat from the container to the evaporator of a refrigeration system. Oxygen under pressure is admitted to the container so as to keep the organ in a viable condition.

---

This is a divisional application of our copending application Ser. No. 391,931, filed Aug. 25, 1964, now Patent No. 3,406,531, patented Oct. 22, 1968.

An object of this invention is to provide method for preserving and maintaining organs in a completely viable state for ultimate transplantation, in which the organs are maintained at a predetermined low temperature and are subjected to hyperbaric oxygenation while immersed in a saline solution.

More specifically this invention relates to a method in which organs such as kidneys and the like are maintained in a completely viable state for relatively long periods of time while awaiting transplantation, in which the organ is immersed in a saline solution while maintained at a temperature of approximately 0° C. to 4° C. while simultaneously subjected to hyperbaric oxygen pressure in excess of approximately three atmospheres.

These and other objects and advantages of the invention will more fully appear from the following description made in connection with the accompanying drawings, wherein like character references refer to the same or similar parts throughout the several views, and in which:

FIG. 1 is an elevational view of the apparatus with certain parts thereof broken away for clarity;

FIG. 2 is a top plan view thereof;

FIG. 3 is a top plan view of a certain part of the circulatory system and taken approximately along line 3—3 of FIG. 1 and looking in the direction of the arrows;

FIG. 4 is a top plan view of a slightly modified form of the invention; and

FIG. 5 is a diagrammatic illustration of certain components of the coolant circulating system and illustrating the flow diagram or pattern of the liquid coolant.

Referring now to the drawings and more specifically to FIG. 1, it will be seen that one embodiment of the apparatus for preserving organs in a viable state, and designated generally by the reference numeral 10, is there shown.

The apparatus 10 includes a housing 11 having casters 12 and which has a suitable hypothermia tank 13 carried by the top thereof. This hypothermia tank, as seen, is of rectangular configuration and includes insulated upstanding side walls 14, an insulated bottom wall 15 and a top wall 16. The cooling tank 13 is adapted to contain a predetermined amount of a liquid coolant therein and since the coolant does not completely fill the interior volumetric space or chamber 17 of the tank 13, there is no liquid contact with the upper wall 16 and the latter does not necessarily have to be of insulated construction. The interior 17 is adapted to be at least partially filled with a liquid coolant such as a permanent anti-freeze solution, a weak alcohol solution or the like which has a relatively low freezing point since the liquid coolant is preferred to be maintained at a temperature within the range of 0° C. to 4° C.

The tank 13 has one end of an inlet conduit 18 connected to the bottom wall 15 thereof in communicating relation therewith and also has one end of an elongate outlet conduit 19 connected to the bottom wall 15 in communicating relation with the interior 17 thereof. The other end of the inlet conduit 18 is connected to the upper end of a tank 20 while the lower or other end of the conduit 19 is connected to a pump mechanism or unit 21. The pump unit which serves to positively circulate the liquid coolant and the circulating coolant system is a positive displacement self-priming rotary vane type and the outlet conduit 19 is connected to the suction side of the pump. One end of a transfer conduit 22 is connected to the pressure side of the pump mechanism or unit 21 and the other end of this transfer conduit is connected in communicating relation with the lower end portion of the coolant tank 20. The coolant tank 20 is of stainless steel construction and has refrigerant coils wound concentrically exteriorly thereof so that the liquid coolant passing through the coolant tank 20 will be continuously cooled. It will be seen that in the circulating system, the liquid passes downwardly through the outlet conduit 19 through the pump unit 21 into the lower end of the coolant tank 20 and thereafter upwardly through the inlet conduit 18 and is ultimately discharged into the interior 17 of the tank 13. With this particular arrangement the liquid coolant within the coolant system may be maintained at a desired predetermined temperature.

The top wall 16 of the tank 13 which is removably connected thereto has a centrally located aperture or opening therein through which projects an annular positioning member 23 having an outturned annular flange 24 which is constructed of a suitable rigid metallic material. The annular outturned flange 24 of the positioning member 23 has a plurality of circumferentially spaced-apart apertures therein, the function of which will be described hereinbelow.

A preservation receptacle 25 constructed of a suitable rigid material and having an outwardly flared open top extends through the opening in the top wall 16 of the hypothermia tank 13 and the flanges thereof are supported upon the outturned flanges of the annular positioning member 23. It will be noted that the positioning member 23 also engages the exterior walls of the preservation receptacle 25 so that the latter is preferably supported so that the coolant within the hypothermia tank 13 contacts substantially the entire lower portion of the receptacle 25 to permit a heat exchange action to take place thereat. In order to promote a highly effective heat exchange action between the liquid coolant within the hypothermia tank and the preservation receptacle 25, the inlet conduit 18 is connected to a short stand pipe 26 arranged vertically of the chamber 17 of the hypothermia tank and which is connected in communicating relation to a horizontally disposed dispersion tube 27 which is arranged transversely of the tank 13. The dispersion tube 27 has a plurality of longitudinally spaced-apart apertures therein through which the liquid coolant is discharged. Thus the liquid coolant discharged through the inlet conduit 18 is dispersed in a wide zone with respect to the interior 17 of the hypothermia tank.

An annular gasket or seal 28 is positioned upon the upper surface of the flanged or flared upper end of the preservation receptacle 25 and is clamped thereagainst by a substantially flat circular cover or closure plate 29. To this end, it is pointed out that the closure plate 29 projects radially beyond the circumferential edges of the flared end of the preservation receptacle 25 and is suitably apertured to receive the bolt assemblies 30 therethrough which also project through the annular flange 24 of the positioning member 23 and apertures in the top plate 16 of the tank 13. It will therefore be seen that the hyperbaric chamber or interior 31 of the preservation receptacle 25 is sealed from the exterior.

Refrigeration system is provided for cooling and maintaining the liquid coolant within the hypothermia tank 13 and this refrigeration system is mounted on the housing 11, as best seen in FIG. 1, and includes the conventional refrigeration components. Although illustrated only diagrammatically, the refrigeration system includes a condensing unit, a thermostatic expansion unit, a filter dryer and an evaporator (not specifically shown). The condensing unit includes the conventional hermetic motor-compressor assembly, a condenser, receiver, and condenser fan and motor, all of which are conveniently mounted on the housing. This unit is also provided with refrigerant shut-off valves and compressor motor starting relay, starting capacitor and overload protector switch.

In the embodiment shown, the refrigeration system is provided with a refrigerant gas such as Freon-12 and this refrigeration system serves to cool the circulating liquid coolant to the desired degree. This Freon refrigerant is circulated through the refrigeration system by means of a conduit 32. The conduit 32 is wound around the exterior surface of the coolant tank 20 and defines an evaporator coil. This lower coolant tank as well as the refrigerant coils are covered with a suitable insulating material so that the heat exchange action takes place between the refrigerant coils and the wall of the coolant tank. The refrigerant which passes through the conduit 32 and the evaporator coils is in turn cooled by the refrigeration system to the desired degree.

The hyperbaric chamber 31 or interior of the preservation receptacle 25 is only partially filled with the saline solution so that a volumetric space is presented above the level of the liquid and the lower surface of the cover or closure plate 28. The process for maintaining organs or living tissue in the completely viable state not only requires that the organs be maintained in a low temperature environment but also that these organs be subjected to a hyperbaric pressure preferably in excess of three atmospheres of oxygen. Oxygen is therefore supplied to the hyperbaric chamber 31 from a suitable source of oxygen under pressure through a conduit 34.

It will be seen that the conduit 34 is connected in communicating relation by a suitable coupling element 33 and a fitting 36 which is carried by the closure plate 28 and which intercommunicates the inlet end of the conduit with the hyperbaric chamber 31. The other end of the conduit 33 is connected to a container 35 which contains a predetermined volume of oxygen under pressure. A pressure gauge 37 is also mounted on the cover plate 28 and serves to indicate the pressure of the hyperbaric chamber. Although not shown in the drawings, suitable valve means are provided for controlling the discharge of the oxygen into the chamber 31 so that the pressure is maintained at the predetermined magnitude.

The preservation receptacle is also provided with temperature indicating means so that an operator may readily know the temperature of the liquid preserving solution within the hyperbaric chamber 31. To this end, a thermometer mechanism 38 is provided having temperature sensing means of conventional construction extending down into the saline solution to sense the temperature thereof and which will be readily indicated on the dial indicator 39. This mechanism 38 is carried by the cover plate 28 and the indicator dial 39 of the temperature indicating mechanism is positioned, of course, exteriorly of the cover plate.

Means are also provided for controlling the temperature of the liquid coolant within the hypothermia tank 13 and this means includes a pre-settable temperature indicating and control mechanism 40 which, as seen, is mounted upon a control panel 50 which projects upwardly from and is attached to the housing 11. This pre-settable temperature control and indicating mechanism 40 is adjustable to pre-set the desired temperature, the liquid coolant in the hypothermia tank is to be maintained at, and includes an adjustable actuator knob which controls a preset indicator needle of the indicator dial 51. This mechanism 40 also includes an indicating needle which actually indicates the temperature of the liquid coolant within the hypothermia tank 13 so that when the indicating needle is disposed in registering relation with the pre-set needle, the refrigeration system is de-energized. However, when the indicating needle is not disposed in registering relation with respect to the pre-set needle, the current to the refrigeration system is energized so that the refrigeration system is operative for cooling the liquid coolant within the hypothermia tank. The particular construction of this pre-settable temperature control and indicating mechanism 40 and the circuitry associated therewith with respect to the refrigeration system is of well known construction in the art and a detailed description thereof and the circuitry is felt unnecessary for the instant application.

Means are also provided for not only indicating the temperature of the coolant within the hypothermia tank 13 but also recording the temperature for a predetermined period of time so that an operator or observer may readily be apprised of whether the temperature necessary to maintain the organ being preserved in a completely viable state has been maintained. To this end, a temperature recorder and indicator mechanism 52 is also mounted upon the control panel 50 and is provided with suitable means for sensing the temperature of the liquid coolant within the hypothermia tank 13. Such a temperature recorder and indicator mechanism may be of the type sold under the trade name of "Electronic 18 Strip Chart Recorder" manufactured and sold by Minneapolis Honeywell Corporation.

This recorder and indicator mechanism will be provided with a strip chart suitably driven and which is engaged by a pin assembly or stylus and continuously records the temperature in a well-known manner. This particular arrangement allows an operator to readily determine if the temperature of the liquid within the preservation receptacle has been maintained so that the organ is in a completely viable state. It will be appreciated that in most instances it is not desirable to have to make histiological studies of the organ to be transplanted. In the event that the refrigeration system is rendered inoperative to allow the temperature of the liquid coolant and the temperature of the preserving environment to exceed the upper limit of the critical range, then the tissue or organ will be damaged or possibly undergo complete necrosis.

It has been found that in order to successfully preserve an organ for approximately twenty-four hours, it is necessary to utilize the low temperature environment as well as subjecting the organ to oxygen under pressure. The importance of oxygen under pressure is not fully understood with respect to the preserving of organs in a completely viable state. It has been found, however, that oxygen consumption decreases exponentially with decreasing temperature and that oxygen saturation increases as the temperature decreases.

Experiments have been conducted with respect to the preservation of kidneys from canine subjects wherein the kidneys were first removed from the animal. Thereafter, the kidney was perfused immediately with refrigerated (5° C.) 5% low molecular weight dextran (40,000) in isotonic saline containing haparin sodium (50 mg. per 50 ml. solution) until a clear effluent from the renal vein was observed. Thereafter the renal vein was cannulated with a polyethylene tube, 10 centimeters in length, and which was oriented in a substantially vertical position. This particular technique permits perfusion of the kidney against the venous pressure of approximately 10 centimeters of water and tends to prevent intrarenal vascular spasms and collapse. Immediately after perfusion of the kidney, it was immersed in a balanced salt solution bath contained within the hyperbaric chamber 31 which had been previously sterilized. The solution is then precooled by the liquid coolant to approximately 0° C. to 4° C. and oxygen was supplied to the hyperbaric chamber 31 at a pressure of approximately three atmospheres.

The kidney was preserved in the hyperbaric chamber for approximately twenty-four hours and was thereafter replanted in the neck of the donor animal by anastomosis of the renal artery and vein to the common carotid and external jugular vein.

Referring now to FIG. 4, it will be seen that the embodiment disclosed therein is of slightly modified construction from that illustrated in FIGS. 1 to 3. In FIG. 4, the top wall 16 of the hypothermia tank is provided with a plurality of openings therein, four of such openings being illustrated, each of which accommodates a preservation receptacle 60, each having a closure plate 61 detachably closing the hyperbaric chamber thereof. The particular construction of these preservation receptacles 60 illustrated in FIG. 4 are substantially identical to that illustrated in FIGS. 1 to 3 with possibly the exception that each of the receptacles 60 may be of slightly smaller volumetric size than the preservation receptacle 25. In all other respects, the apparatus illustrated in FIG. 4 is identical to that shown in FIGS. 1 to 3 and further detailed description thereof is felt unnecessary.

It will be seen from the foregoing description that the apparatus and process described require that the organ or tissue to be preserved for a period of time must not only be cooled and maintained in a cooled environment of approximately 0° C. to 4° C. but also necessitates subjecting the organ to oxygen pressure of approximately three atmospheres. In some instances, it is desirable to maintain the organ at a low temperature between 0° C. to 4° C. while subjecting the same to oxygen pressure within the range of five to ten atmospheres. As pointed out above, it has been found that through hypothermia or cooling, the oxygen consumption of an organ such as a kidney is relatively low, and it may be that the smaller the amount of oxygen which is actually consumed may be vital to the maintenance of cellular viability.

Kidneys which were removed from the canine subjects and preserved in vitro for approximately twenty-four hours by combining hypothermia (0° C. to 4° C.) with hyperbaric oxygenation at approximately three atmospheres of oxygen, and which preserved kidneys were thereafter replaced, apparently functioned normally and are able to sustain the life of the donor canine subject after contralateral nephrectomy.

From the foregoing it will be seen that a method and apparatus for preserving and maintaining organs in a completely viable state for transplantation has been provided utilizing hyperbaric oxygenation and hypothermia. It will be noted from the preceding paragraphs that organs from canine subjects have been preserved at relatively low temperatures when such organs have been immersed in a preserving saline solution and when subjected to concentrations of oxygen approximating three atmospheres.

Thus it will be seen that a relatively uncomplicated apparatus and process has been evolved for preserving and maintaining organs in a completely viable state so that such organs may later be used for transplantation.

It will, of course, be understood that various changes may be made in the form, details, arrangement and proportions of the various parts without departing from the scope of our invention.

What is claimed is:

1. A method for preserving and maintaining organs in a completely viable state for transplantation, said method comprising
   immersing an organ to be preserved in a liquid preserving solution within a chamber sealed from the exterior, maintaining the preserving solution and the organ immersed therein at a temperature within the range of 0° C. to 4° C., introducing oxygen under pressure into the chamber and maintaining the oxygen pressure within the chamber at a predetermined magnitude in excess of at least one atmosphere.

2. A method for preserving and maintaining organs in a completely viable state for transplantation, said method comprising
   immersing an organ to be preserved in a liquid preserving solution within a chamber sealed from the exterior, maintaining the preserving solution and the organ immersed therein at approximately 0° C., introducing oxygen under pressure into the chamber and maintaining the oxygen pressure within the chamber at a predetermined magnitude in excess of at least one atmosphere.

3. A method for preserving and maintaining organs in a completely viable state for transplantation, said method comprising
   immersing an organ to be preserved in a liquid preserving solution within a chamber sealed from the exterior, maintaining the preserving solution and the organ immersed therein at a temperature within the range of 0° C. and 4° C., introducing oxygen under pressure into the chamber and maintaining the oxygen pressure within the chamber at a predetermined magnitude in excess of at least three atmospheres.

References Cited

UNITED STATES PATENTS

| | | | |
|---|---|---|---|
| 2,485,791 | 10/1949 | Tucker | 128—1 |
| 2,662,520 | 12/1953 | McMahon | 62—59 |

WILLIAM E. WAYNER, Primary Examiner

U.S. Cl. X.R.

128—1; 424—183